United States Patent [19]

Ludeman

[11] 3,898,823

[45] Aug. 12, 1975

[54] DEVICE FOR RESILIENTLY LOCKING AIRCRAFT CONTROLS

[76] Inventor: Russell S. Ludeman, 982 Miller Rd., Lake Orion, Mich. 48035

[22] Filed: July 23, 1973

[21] Appl. No.: 381,905

[52] U.S. Cl. .................. 70/200; 70/209; 70/238; 74/495; 267/150; 244/83 A
[51] Int. Cl.² ............................ B64C 13/14
[58] Field of Search ......... 70/14, 57, 199, 200, 237, 70/238, 239, 254, 255; 244/83 A; 74/495, 532; 16/52, 53, 56, 72, 81, 85; 248/356; 267/150, 166

[56] References Cited
UNITED STATES PATENTS

| | | | |
|---|---|---|---|
| 1,361,391 | 12/1920 | Maceska | 70/199 |
| 1,531,062 | 3/1925 | Barravecchia | 70/211 X |
| 1,628,731 | 5/1927 | Meer | 70/200 |
| 1,743,360 | 1/1930 | Lang | 16/52 |
| 2,035,231 | 3/1936 | Haberstro | 244/83 A UX |
| 2,348,101 | 5/1944 | Appel | 244/50 |
| 3,125,898 | 3/1964 | Maples et al. | 74/532 |
| 3,190,090 | 6/1965 | Zaidener | 70/238 X |
| 3,190,592 | 6/1965 | Grizzle | 248/20 |
| 3,330,504 | 7/1967 | Lewis | 244/83 A |
| 3,690,131 | 9/1972 | Davis | 70/203 |

*Primary Examiner*—Albert G. Craig, Jr.

[57] ABSTRACT

A device for resiliently locking the controls of an aircraft having a pedal-controlled rudder and elevators and ailerons controlled by a wheel-operated, longitudinally shiftable and rotatable control column, and, at the same time, locking the main landing gear parking brake, if so desired. In the form shown, the device comprises a tube containing a series of suitable alternating spacer spring seats and interchangeable coil springs and having an adjustable member at one end formed with opposing slots to receive the edges of adjacent rudder pedals and an adjustable slotted element at the other end for receiving the wheel, the wheel receiving member having a rod and spacer extending therefrom into the tube, allowing limited movement thereof in either direction through the tube against the force of the springs. The wheel element and, if desired, the pedal member, are formed to receive a pin or a padlock for either temporarily holding or locking the same in place.

4 Claims, 7 Drawing Figures

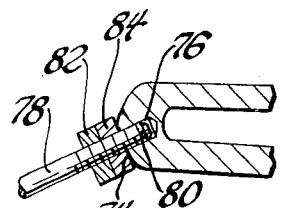
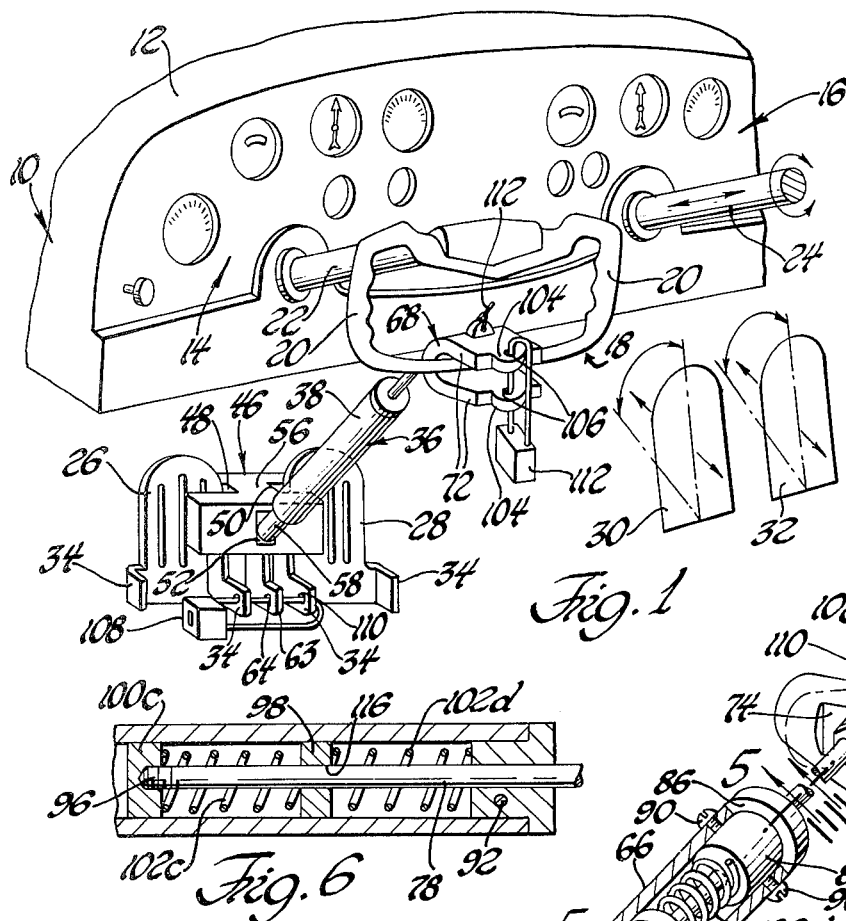
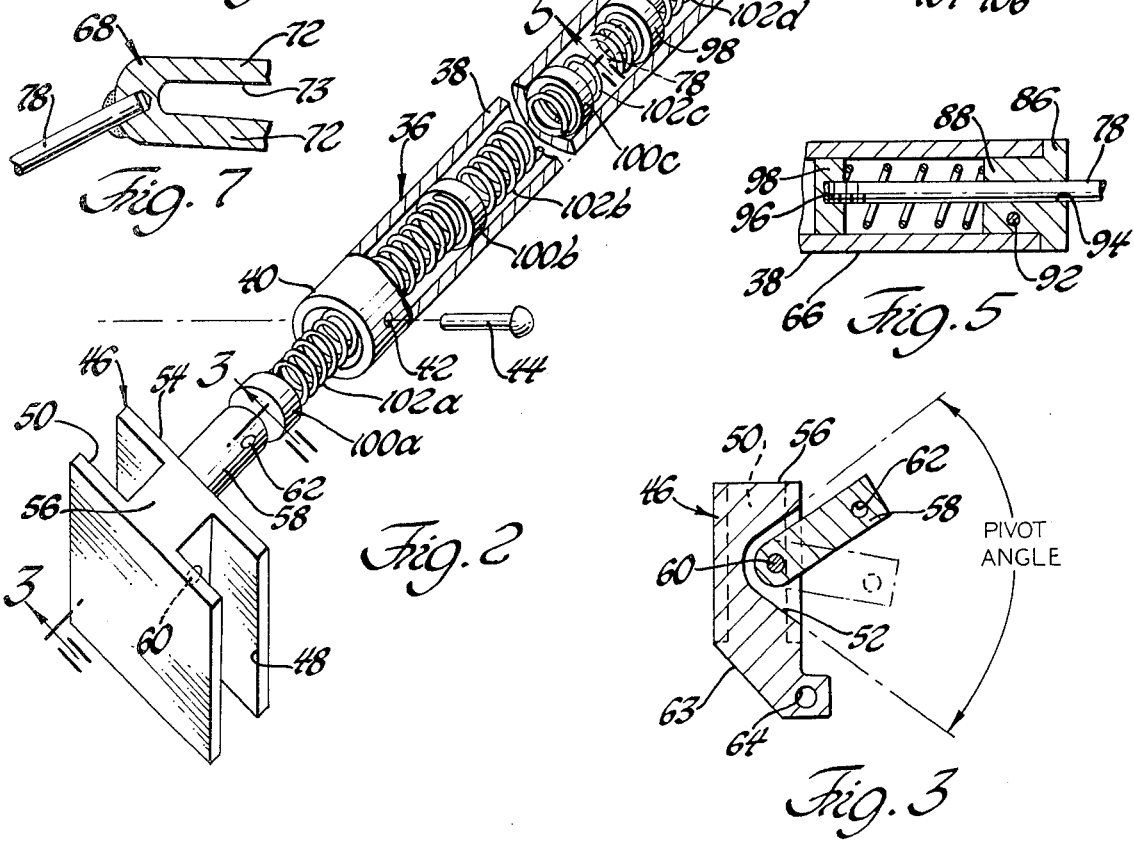

DEVICE FOR RESILIENTLY LOCKING AIRCRAFT CONTROLS

BRIEF SUMMARY OF THE INVENTION

This invention relates generally to aircraft devices, and more particularly to an improved device for resiliently securing or locking the rudder pedals to the wheel, and, at the same time, locking the main landing gear parking brakes, if so desired.

As is well known, most light aircraft for private use are provided with cable operated rudder, elevator and aileron flight controls, the rudder being positioned by a pair of foot pedals, the elevators being positioned by pushing forward and pulling backward on the column connected to the wheel and the ailerons being positioned by rotating the wheel.

Such aircraft are often not hangared but merely tied down outside when not in use so as to be subject to the elements and theft. If no flight control surface locking devices are employed, the wind acting thereon "slams" them against their stops, straining these surfaces, their mounting pivots and the cables and other control linkage elements therefor.

Flight control surface locking devices and the need therefor are already known. Some such devices separately lock the individual flight control surfaces separately and must be applied outside the cabin, which is not only time consuming and uncomfortable in inclement weather, but also dangerous if they are not all removed before attempting to operate the aircraft. Other such devices are applied to all flight control surface operating means within the cabin, but they rigidly lock the flight control surfaces so that portions thereof, such as the pivots, may still be damaged by strong winds in a manner similar to aircraft with no control surface locks.

Further, such prior art locks do not at the same time lock the landing gear parking brakes, and no provision is made to secure the same against simple removal and subsequent theft of the aircraft. That is, while such prior art devices are perhaps easily applied, they are just as easily removed, once access is gained into the aircraft cabin, so that the aircraft can be operated and stolen. Alternatively, if the parking brakes are not locked, the aircraft can easily be towed from its parking location to some more remote area where equipment, such as radios, can be stolen.

Accordingly, an object of this invention is to provide a device which (a) is easily applied (b) inside the aircraft cabin (c) to all flight control surface operating elements, such as the pedals and wheel (d) to resiliently and (e) temporarily, as by a removable pin or (f) more permanently and securely, as by a padlock (g) simultaneously lock all flight control surfaces (h) in a neutral position (i) against deliberate operation, as in flying the aircraft, (j) but allowing the control surfaces to react resiliently, as they operate in response to pilot manipulation during actual flight, (k) in either direction from the neutral position (l) against the resisting force of springs, (m) the springs being interchangeable so as to enable adjustment of the resisting force and length of the device and (n) the rudder pedal and wheel engaging member and element being (o) adjustable and positionable so as to adapt the device to a variety of particular aircraft control configurations. At the same time, the device, when applied to the aircraft when the toe-operated parking brakes are applied, also (p) locks the main landing gear wheels so that the wheels (q) will not rotate, but must be skidded, to move the aircraft.

Another object of the invention is to provide such a device having one or more of the above features and that is easily constructed, maintained and stored.

These and other objects and advantages of the invention will become more apparent by reference to the following detailed description and the appended drawings.

BRIEF DESCRIPTION OF THE SEVERAL VIEWS OF THE DRAWINGS

FIG. 1 is a fragmentary perspective view of an aircraft cabin interior illustrating a device embodying the invention in use.

FIG. 2 is an enlarged partially-exploded perspective view, with portions thereof cut away and in cross section, of the device shown in FIG. 1.

FIG. 3 is a cross-sectional view, taken in the plane of line 3—3 of FIG. 2 and looking in the direction of the arrows.

FIG. 4 is a cross-sectional view, taken in the plane of line 4—4 of FIG. 2 and looking in the direction of the arrows.

FIG. 5 is a cross-sectional view, taken in the plane of line 5—5 of FIG. 2 and looking in the direction of the arrows.

FIG. 6 is a view similar to FIG. 5, but illustrating a modification of the invention.

FIG. 7 is a view similar to FIG. 4, but illustrating another modification of the invention.

DETAILED DESCRIPTION

Referring now to the drawings in greater detail, the cabin interior 10 of a typical light aircraft, which is shown as a two-place aircraft, includes an instrument panel 12 having the usual command pilot and co-pilot instrument clusters 14 and 16, respectively. The command wheel 18 has the usual gripping portions 20 enabling the control column 22 to be moved longitudinally forward and backward to operate the elevators (not shown) and rotated right or left to operate the ailerons (not shown). The co-pilot column 24, which is operated in a similar manner, is shown without the wheel.

The command left and right rudder pedals 26 and 28 operate the aircraft rudder (not shown), the pedals being movable forward and backward for rudder operation and pivotable about the lower ends thereof (pivot structure not shown) by depressing the top ends thereof with the toe (referred to as a toe brake) to set the parking brakes, locking the main landing gear wheels (not shown), in a manner well known to those who fly or are familiar with aircraft of this type.

The arrows shown adjacent the co-pilot controls illustrate the various control movements, except that the parking brake usually can be set only with the command position pedals. Also, locking the command position controls normally locks the flight control surfaces so that the aircraft cannot be operated from the co-pilot position.

The rudder pedals, including the co-pilot's pedals 30 and 32, usually are formed with side tabs 34 to prevent the pilot's feet from sliding sideways off the pedals.

Typical light aircraft flight control surface operating systems include elements such as push-pull rods, bell cranks having slots receiving stop bushings and pivots, direct and carry-through cables, pulleys, etc., connected between the flight control surfaces and the operating rudder pedals and wheel. It is these elements, as well as the flight control surfaces themselves, that may be damaged by being slammed back and forth, as from one stop to the other, by the wind.

Referring now to FIG. 2, the device 36 comprises a main body cylindrical tube 38, which may be constructed from any desired material and of any suitable length, as will be explained, the lower end 40 of the tube being formed with hole 42 to receive a rivet or other suitable fastener 44.

A member 46, which may be cast, machined or formed in any other desired manner includes oppositely disposed slots 48 and 50 for receiving the adjacent edges of the rudder pedals 26 and 28, respectively, and a wedge slot 52 extending inwardly from the surface 54 into the web 56. The slot 52 receives a connecting member 58, which is pivotally connected to member 46 by means of a pin or rivet 60. The free end of connecting member is cylindrical so as to be receivable in the lower end 40 of tube 36 and formed with a hole 62 to receive rivet 44. Thus, the member 46 is rigidly secured to the end 40 of the tube 38, except that it is pivotable on pin 60 through a pivot angle determined by the divergent edges of slot 52.

It will be noted that member 46 has formed thereon a depending tab or lug 63 shaped and dimensioned generally similar to the tabs 34 on the pedals 26 and 28 and having an opening 64 formed therein for a purpose to be described.

The opposite end 66 of the tube 38 has movably secured thereto the wheel element 68, which, like member 46, may be cast and/or machined or otherwise formed in a generally "U" shape having a base 70 and spaced legs 72 providing a slot 73 adapted to receive a portion of the control wheel 18. The base may be formed with a flat 74 offset from (not normal to) the plane of the legs 72 and having a threaded passage 76 formed therein. A rod 78 having a threaded end 80 is threaded into passage 76, the jam nuts 82 and 84 being employed to lock the rod 78 to the element 68 at any desired (broken line) angle.

The end 66 of tube is closed by a bushing 86 having a reduced portion 88 fitted in the tube and secured therein by set screws 90 (FIG. 2) or a rivet 92 (FIG. 5). The bushing is formed with a central passage 94 slidably receiving rod 78, the end 96 of which is threaded into the disc or spacer spring seat 98 slidable within the tube 38. If the rivet 92 is employed, it passes through both the tube 38 and the bushing porition 88, to the side of passage 94.

Any desired number of spacer discs 100 are slidably positioned within the tube 38, which, together with disc 98, serve as spring seats for interchangeable helical coil springs 102.

Referring again to element 68, it will be observed that the legs 72 may have projections 104 having aligned openings 106 for a purpose to be described. A lug 108 is formed with an opening 110 in which a wire 112 is fixed, the other end of the wire having secured thereto a pin 114 adapted to be received in the openings 106.

It will be realized that while the typical light aircraft has rudder pedals 26 and 28 and a wheel 18 for moving backward and forward and for rotating a control column 22, the design, dimensions, location and spacing thereof may differ slightly from one aircraft to another. For this reason, the seats in such aircraft are adjustable to accommodate pilots of varying physical dimensions. Also, the flight control surfaces (rudder, elevators and ailerons) thereof vary in area so as to develop different forces in response to winds of varying velocities.

For the above reasons, it is contemplated that more than one specific configuration of device 36, in terms of length of tube 38, spacing and width of slots 48 and 50 and width of web 56, shape of slot 52, length of rod 78, offset of flat 74, angle between axis of rod 78 and plane of slot 73, width of slot 73, design of member 46 and element 68, and force of springs 102, may be required to accommodate the entire range of light aircraft in use. This is so, although any particular device 36 incorporates some adjustments, such as the angle of tube 36 with respect to member 46, distance between member 46 and element 68, angle of element 68 with respect to member 46, force of springs 102, etc. For example, in cases where column 22 is secured to the bottom of wheel 18, rather than to the top thereof, as shown in FIG. 1, rod 78 may be offset or element 68 may be slotted differently.

Operation

The rudder control linkage is such that when the rudder pedals 26 and 28 are free, as when the aircraft is not in use, the rudder, and thus the pedals, are in the neutral position. In typical nosewheel type aircraft, the rudder pedals also control the nosewheel for steering on the ground. Further, in typical light aircraft, the pedals are pivotally mounted in a manner so that toe pressure rotates the pedals to operate the brake cylinder, and means are provided to set a parking brake control.

The above neutral free position is normally not true of the elevators and ailerons controlled by the wheel column. That is, when the aircraft is on the ground, these flight control surfaces will remain in positions corresponding to the position in which the wheel is left.

However, as stated above, the linkages for all of these flight control surfaces, which are movable a given number of degrees to either side of a neutral position, have stops against which certain elements of the linkages may be banged when the aircraft is parked outside in a strong wind. Such banging or slamming of these flight control surfaces, which does not occur in flight for which the aircraft was designed, accelerates wear of these linkage members and may, in fact, damage the flight control surfaces to the extent that repairs, which may be costly and time consuming, must be made before safe flight can be attempted.

For any particular aircraft, the device 36 is of a configuration such that the distance from the rudder pedals 26 and 28, in their neutral position, and preferably also in their parking-brake-on position, to the wheel 18 in its neutral aileron and elevator position is equal to the dimension of device from the slots 48 and 50 of rudder pedal member 46 to the slot 73 of wheel element 68.

It will thus be evident that upon landing, engine shut-down and application of the parking brake, the device 36 is applied, as shown in FIG. 1, by sliding the member 46 between the adjacent pedals 26 and 28 so that the adjacent edges thereof are received in the slots 48 and 50, respectively. The tube 38 is then pivoted upwardly about the pin 60 so that the element 68 is adjacent the wheel 18 and the wheel is pulled back and fitted into the slot 73, at which time it will be adjusted to its neutral position.

If the aircraft is merely being parked temporarily, with no danger of theft, but under windy conditions, the pin 114 can merely be inserted through the holes 106 in tabs 104. On the other hand, if the aircraft is being parked and left so that it is subject to theft, a padlock 108 may be inserted through the opening 64 in tab 63 and openings 110 drilled through adjacent pedal tabs 34 so as to prevent removal of the member 46. Likewise, a padlock 112 may be inserted through openings 106 of tabs 104 to prevent removal of element 68.

From the standpoint of protection from theft, if the aircraft, when not in use, is (1) tied down to ground anchors, (2) with the cabin doors locked and (3) with the device 36 in place and locked by padlocks 108 and 112, there is a considerable degree of protection afforded, since the locks, which are usually made of hardened steel must be cut and removed before the device 36 can be removed for flight, or even before the aircraft can be towed, since the parking brakes are also locked in the "on" position. In fact, it has been found that member 46 of device can be designed so that the parking brake cannot be released despite the springs 102.

If the elements of the device 36 are also constructed of hardened steel, they cannot be cut away more readily than the locks. Also, the rod 78 can be made to extend into tube 66 a sufficient distance so that the maximum separation of the pedals 26 and 28 and wheel 18, while the member 46 and element 68 are locked in place, will not permit removal of the rod 78 from the tube 66.

Rod 78 can be connected to any desired spacer. In FIG. 2, for example, if rod 78 were connected to spacer 100c, instead of to spacer 98, then spacer 98 (see FIG. 6 and dotted lines of FIG. 2) would have an opening 116, similar to opening 94 in bushing 86, slidably receiving rod 78 so as to provide an even number of springs on either side of spacer 100c to which the rod 78 is connected. Also, as shown in FIG. 7, the rod 78 may be welded or otherwise permanently secured to element 68.

From the standpoint of protection from wind damage, the flight control surfaces are retained in their neutral position, but not all rigidly locked. For example, when device 36 is applied to the controls, the wheel is positioned in its neutral position, but if a wind occurs, the elevators controlled by the column can move, the force of such movement depending upon the wind direction and velocity and the size (area) of the elevators. That is, in the structure of FIG. 6, initial movement of the elevators in either direction begins to compress either the springs 102a and 102b between the spacers 100a and 100b and spacer 100c, to which the end 96 of rod 78 is connected, or springs 102c and 102d between spacer 100c, spacer 98, through which rod 78 passes, and the reduced diameter end 88 of bushing 86, providing a progressively increasing spring force resiliently resisting further movement of the elevators, and its control column 22, back to the neutral position. The springs can be selected, for any particular device 36, designed to fit a number of specific aircraft, so that the elevator control linkages of those particular aircraft will never be permitted to move against the stops thereof.

Likewise, if the slots 48 and 50 for the rudder pedals 26 and 28, respectively, are made wide enough to allow movement of the rudder pedals within the slots, limited movement of the rudder short of the rudder linkage stops will be permitted in response to wind forces, even if lock 108, which can pivot within opening 64, is in place, or if the lock openings are formed as slots.

Also, since rod 78 is free to rotate within tube 38, limited rotation of wheel 18, and movement of the ailerons controlled thereby, is possible in response to wind forces, short of the linkage stops.

Any movement of a control surface in response to wind reduces the force of the wind acting on and stressing that surface because the angle between the control surface and wind direction will be decreased.

The same will be true in the case of the elevators and/or ailerons, although these flight control surfaces, being positioned more nearly horizontal, do not experience as great a force to move the same due to wind, which is usually also in a generally horizontal direction.

The invention has been shown and described in such clear and concise terms as to enable one skilled in the art to practice the same. While a preferred embodiment and certain modifications thereof are disclosed, other modifications within the scope of the appended claims will be apparent.

What I claim as my invention:

1. In combination, an aircraft with controls for rudder, aileron and elevator flight control surfaces, said controls comprising at least one foot-operated rudder pedal and a hand-operated column and wheel for controlling the elevators and ailerons, respectively, and a device for securing said aircraft against rudder, elevator and aileron wind damage, said device comprising a member attached to said pedal, an element attached to said wheel and a telescoping element attached to and extending between said member attached to said pedal and said element attached to said wheel, said device having resilient means for maintaining a predetermined free length thereof, but permitting either extension or contraction thereof against a resilient resisting force provided by said resilient means, whereby the rudder, elevator and aileron surfaces are restricted against free movement but at least one of the surfaces are permitted some degree of resiliently resisted movement.

2. The combination of an aircraft having left and right foot-operated pedals, with adjacent edges, for applying parking brakes and controlling the aircraft rudder surface, said pedals being in the neutral-rudder position when free, said pedals being movable forward and backward in their brake-off position for rudder operation, and said pedals being also pivotally mounted and their connection to the parking brakes being such that toe pressure rotates said pedals to a position different from their brake-off position to set the parking brakes, hand-operated wheel and column controls for controlling the aircraft aileron and elevator surfaces, said wheel being rotated to control the aileron surfaces and said column being movable forwardly and backwardly to control the elevator surfaces, and a device for protecting said aircraft from theft and from wind damage to the rudder, aileron and elevator surfaces, said device having first means connecting the same to said pedals in either their brake-on or brake-off positions, second means connecting the same to said wheel and telescoping means connected between said first and second means, said telescoping means having resilient means for maintaining a predetermined length thereof that is substantially equal to the distance between said first and second means when the rudder, aileron and elevator surfaces are in their neutral positions, said resilient means preventing unrestrained movement of said surfaces but permitting at least some degree of resiliently-resisted movement of at least one of said surfaces in response to wind forces thereon.

3. A device for securing against theft and flight control surface wind damage an aircraft having at least one foot-operated rudder pedal and a hand-operated column and wheel for controlling the elevators and ailerons, said device comprising a member attachable to said pedal, an element attachable to said wheel and a telescoping element attached to and extending between said pedal member and said wheel element, said telescoping element having means for maintaining a predetermined free length thereof but permitting extension or contraction thereof against a resilient resisting force, whereby said rudder, elevator and aileron flight control surfaces are restricted against free movement but permitted some degree of resiliently-resisted movement, said telescoping element comprising a cylindrical tube and a cylindrical rod received therein with clearance, said pedal member comprising a body having oppositely disposed slots formed therein separated by a web, said oppositely disposed slots being adapted to receive the adjacent edges of spaced rudder pedals, said web having a slot formed therein with diverging sides, said pedal member being secured to one end of said tube by means of a connecting member having one end received in said web slot and secured therein by a pivot pin so that said pedal member is pivotable thereon to the extent permitted by said divergent sides, the other end of said connecting member being cylindrical and received in and secured to said tube, the other end of said tube being closed by a cylindrical bushing spring seat member having a portion thereof received in and secured to said tube, said bushing having an axial opening therethrough slidably receiving said rod, the free end of said rod within said tube being secured to a disc-like spacer spring seat member slidable within said tube, at least one free disc-like spacer spring seat member slidable in said tube on at least one side of said disc connected to said rod, at least one helical coil spring disposed in said clearance between said spring seats, the free end of said rod disposed outside said tube being connected to said wheel element, said wheel element comprising a generally "U" shaped body having a base, spaced legs extending from said base with a slot therebetween, said slot being adapted to receive therein said wheel, at least said pedal member or said wheel element having an opening therein to receive a padlock to secure the same to said pedals or said wheel, respectively, the free length of said device between said pedal member and said wheel element slots being substantially the same as the distance between the pedals and the wheel in their neutral positions.

4. A device for use in an aircraft having parking brakes and a movable rudder surface controlled by left and right foot-operated pedals having adjacent edges, the pedals positioning the rudder in its neutral position when the pedals are in their free, brake-off position and the pedals being movable forward and backward for rudder operation, the pedals being also pivotally mounted and the connection thereof to the brakes being such that toe pressure rotates the pedals, to a position different from their brake-off position, to set the parking brakes, and aileron and elevator surfaces movable from their neutral positions by a hand-operated wheel and column, the ailerons being operated by rotating the wheel and the elevators being operated by forward and backward movement of the column, for protecting the aircraft from theft and from wind damage to the rudder, aileron and elevator surfaces, said device comprising a pedal member adapted to be disposed between said pedals, a wheel element adapted for connection to said wheel and a telescoping element attached to and extending between said pedal member and said wheel element, said telescoping element having resilient means associated therewith for maintaining a predetermined free length thereof, but permitting either extension or contraction thereof against resisting forces provided by said resilient means, said pedal member having oppositely-disposed slots formed therein, each of said slots being adapted to receive an adjacent edge of one of said pedals, and said pedal member being pivotally mounted to one end of said telescoping element so that said pedal member may be rotated to positions whereby said slots therein are in position to receive said pedal edges in either the brake-on or the brake-off positions of said pedals, said wheel element having means for receiving a portion of said wheel, said free length of said telescoping element being such that the distance between said slots in said pedal member and said means for receiving a portion of said wheel is substantially equal to the distance between said pedal edges and said wheel portion when said rudder, aileron and elevator surfaces are in their neutral positions.

* * * * *